(12) United States Patent
Nakanishi

(10) Patent No.: US 9,399,301 B2
(45) Date of Patent: Jul. 26, 2016

(54) JOINT SEAL STRUCTURE OF ROBOT

(71) Applicant: KAWASAKI JUKOGYO KABUSHIKI KAISHA, Kobe-shi, Hyogo (JP)

(72) Inventor: Tetsuya Nakanishi, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 0 days.

(21) Appl. No.: 14/650,235

(22) PCT Filed: Nov. 28, 2013

(86) PCT No.: PCT/JP2013/006992
§ 371 (c)(1),
(2) Date: Jun. 5, 2015

(87) PCT Pub. No.: WO2014/087615
PCT Pub. Date: Jun. 12, 2014

(65) Prior Publication Data
US 2015/0321362 A1    Nov. 12, 2015

(30) Foreign Application Priority Data

Dec. 5, 2012    (JP) .................................. 2012-266207

(51) Int. Cl.
*F16L 37/00* (2006.01)
*B25J 19/00* (2006.01)
(Continued)

(52) U.S. Cl.
CPC .......... *B25J 19/0058* (2013.01); *B25J 19/0075* (2013.01); *B25J 21/00* (2013.01); *F16J 15/3268* (2013.01)

(58) Field of Classification Search
CPC .......... F16L 21/00; F16L 21/02; F16L 21/03; F16L 21/035; F16L 21/04
See application file for complete search history.

(56) References Cited

U.S. PATENT DOCUMENTS

2012/0313366 A1* 12/2012 Rahimy .................... A61J 1/20
285/3

FOREIGN PATENT DOCUMENTS

JP    H05-305596 A    11/1993
JP    H07-96487 A    4/1995
(Continued)

OTHER PUBLICATIONS

Jan. 21, 2014 International Search Report issued in Application No. PCT/JP2013/006992.
(Continued)

*Primary Examiner* — Gilbert Lee
(74) *Attorney, Agent, or Firm* — Oliff PLC

(57) ABSTRACT

Joint seal structure of robot, includes fitting end portion provided on an end portion of second member and fittingly inserted into tubular end portion of first member; a peripheral groove provided on an inner peripheral surface of tubular end portion to extend over an entire periphery; and an annular seal member accommodated into peripheral groove and in sealing contact with outer peripheral surface of fitting end portion. Fitting end portion has smaller diameter than body of second member, a stepped surface between body and fitting end portion faces an end surface of tubular end portion and located close to end surface of tubular end portion in an axial direction, and a gap is provided between stepped surface and end surface of tubular end portion such that gap extends over entire periphery, is opened to outside of first member and second member, and is expanded as gap extends radially outward.

13 Claims, 8 Drawing Sheets

(51) Int. Cl.
 *F16J 15/32* (2016.01)
 *B25J 21/00* (2006.01)

(56) References Cited

FOREIGN PATENT DOCUMENTS

| JP | 2001-254787 A | 9/2001 |
|---|---|---|
| JP | 2008-055560 A | 3/2008 |
| JP | 2009-041697 A | 2/2009 |
| JP | 2009-107116 A | 5/2009 |
| WO | 2009/069389 A1 | 6/2009 |

OTHER PUBLICATIONS

Jan. 21, 2014 Written Opinion issued in International Application No. PCT/JP2013/006992.

* cited by examiner

JOINT SEAL STRUCTURE OF ROBOT

TECHNICAL FIELD

The present invention relates to a joint seal structure of a robot, which is applied to the joint of the robot including a first member and a second member fittingly inserted into the tubular end portion of the first member, and includes a seal member provided in a gap formed between these members.

BACKGROUND ART

The joint of a robot contains a drive mechanism for relatively rotating two coupled members which are to be coupled to each other via the joint. To prevent a lubricant from leaking out of the drive mechanism to an external environment of the robot, or inhibit the entry of foreign matters from the external environment into the joint, seal members are provided in a gap formed between the two coupled members (e.g., see Patent Literature 1).

In the example disclosed in Patent Literature 1, one joint is provided with the two seal members separately. The two coupled members are coupled to each other in such a manner that their peripheral walls are arranged in a rotational axis direction with a small gap between the peripheral walls. The second seal member at an outer side seals the gap formed between the peripheral walls. The second seal member defines the peripheral wall of the whole joint, together with the two coupled members, and is exposed to the external environment.

CITATION LIST

Patent Literature

Patent Literature 1: Japanese Laid-Open Patent Application Publication No. 2008-55560

SUMMARY OF INVENTION

Technical Problem

In a case where the robot is used to manufacture products which should be manufactured in a contamination-free environment and the external environment of the robot requires a high clean level, the seal member plays a very important role. In this case, it is necessary to wash the robot regularly to keep the robot itself clean. When the robot is used to produce medicinal products or cultivate cells in regenerative medicinal techniques, and therefore, the above demand is especially strong, high-pressure washing water is injected from the external environment to the robot to wash the robot, in some cases.

However, in the joint seal structure disclosed in Patent Literature 1, the second seal member is exposed to the external environment. For this reason, the seal performed by the second seal member cannot withstand a water pressure and the seal function performed by the second seal member is temporarily lost. In this situation, the washing water is likely to flow into the joint. This may expose the drive mechanism to the washing water. Also, during the operation of the robot, the washing water accumulated in the interior of the joint may undesirably leak to the external environment through the gap formed between the peripheral walls of the members.

An object of the present invention is to protect seal even when the robot is washed with the high-pressure washing water.

Solution to Problem

The present invention has been made to solve the above described object, and provides a joint seal structure of a robot, including a first member and a second member fittingly inserted into a tubular end portion of the first member, the joint seal structure comprising: a fitting end portion which is provided on an end portion of the second member and fittingly inserted into the tubular end portion; a peripheral groove provided on an inner peripheral surface of the tubular end portion to extend over an entire periphery; and an annular seal member which is accommodated into the peripheral groove and is in sealing contact with an outer peripheral surface of the fitting end portion, wherein the fitting end portion has a smaller diameter than a body of the second member, wherein a stepped surface formed between the body and the fitting end portion faces an end surface of the tubular end portion and is located close to the end surface of the tubular end portion in an axial direction, and wherein a gap is provided between the stepped surface and the end surface of the tubular end portion such that the gap extends over the entire periphery, is opened to outside of the first member and the second member, and is expanded as the gap extends radially outward.

In accordance with this configuration, since the seal member is accommodated into the peripheral groove formed on the inner peripheral surface of the tubular end portion, the seal member can be protected from an external environment, and high-pressure washing water is less likely to directly contact the seal member even when the high-pressure washing water is injected to the robot to wash the robot. Because of this, the seal function is less likely to be lost due to the high-pressure washing water, and the washing water is less likely to flow into the joint. Since the gap is expanded as it extends radially outward, the high-pressure washing water is allowed to contact the gap while avoiding the high-pressure washing water from directly contacting the seal member, and thus, the inside region of the gap can be washed. The water which flows into the inside region of the gap can be easily discharged through the expanded gap.

The end surface of the tubular end portion may have an opening via which the peripheral groove is in communication with the gap. In accordance with this configuration, the high-pressure washing water is allowed to contact the gap and the region in the vicinity of the seal member to wash the region in the vicinity of the seal member while avoiding the high-pressure washing water from directly contacting the seal member, and the water which has flowed into the peripheral groove can be discharged through the opening and the gap. The opening may be one of openings arranged to be spaced apart from each other in a circumferential direction. Or, the opening may extend over the entire periphery.

A portion of the seal member may be exposed from the end surface of the tubular end portion into the gap and located closer to a center in a radial direction than an outer peripheral surface of the tubular end portion and an outer peripheral surface of the body.

The robot is suitably a robot used to produce medicinal products. In accordance with the above configuration, the present invention can be suitably practiced in an operation place which strongly requires a high clean level.

Advantageous Effects of Invention

As should be clearly understood from the above, in accordance with the present invention, seal can be protected even when a robot is washed by using high-pressure washing water.

DESCRIPTION OF EMBODIMENTS

Hereinafter, the embodiment of the present invention will be described with reference to the accompanying drawings. Throughout the drawings, the same or corresponding components are identified by the same reference symbols and will not be described in detail repeatedly.

Figure 1:
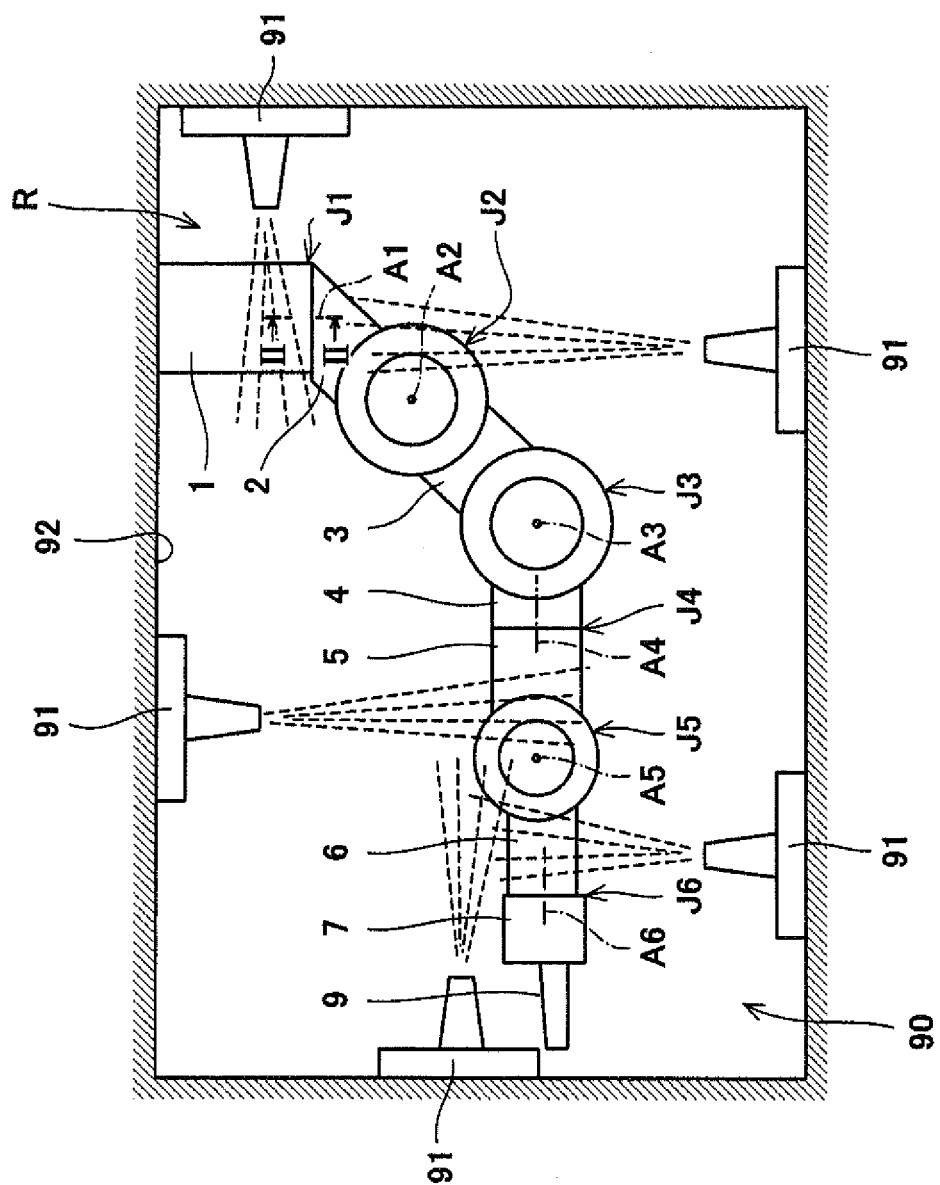
FIG. 1 is a schematic view of a robot according to Embodiment 1.

FIG. 1 is a schematic view of a robot R according to Embodiment 1. Although in the present embodiment, the robot R is used to produce medicinal products, it may be used for other purposes. Although in the present embodiment, the robot R is a vertical articulated 6-axis robot, the number of axes is not limited to 6, and the robot R may be a robot having another form other than the vertical articulated robot so long as the robot R includes the joints.

As shown in FIG. 1, in a case where the robot R is used to produce the medicinal products, the robot R is placed in a sterilized (germ-free) operation space 90, and handles the raw material, intermediate products or finished products of the medicinal products in the operation space 90. To keep the robot R clean, a plurality of washing nozzles 91 are arranged in a dispersed manner in the operation space 90. The washing nozzles 91 are used to wash the robot R regularly, and are able to inject the washing water with a high pressure. The washing water is injected from the washing nozzles 91 to the robot R, to sterilize the surface of the robot R, or wash away dusts generated in the robot R. In the regular washing for the robot R, the washing nozzles 91 may inject a sterilization gas to the robot R. The sterilization gas is injected to the robot R to sterilize the surface of the robot R.

The robot R includes a base member 1, a rotary member 2, a base end arm 3, a distal (tip) end arm 4, a base end wrist 5, a distal end wrist 6, and an attachment 7. These members 1 to 7 are coupled to each other serially in this order. The base member 1 is installed on a wall surface 92 defining the operation space 90. The rotary member 2 is coupled to the base member 1 via a first joint J1 and is rotatable around a first rotational axis A1 with respect to the base member 1. The other members 3 to 7 are coupled to the members 2 to 6 via second to sixth joints J2 to J6, respectively. The members 3 to 7 are rotatable around second to sixth rotational axes A2 to A6 with respect to the members 2 to 6 to which the members 3 to 7 are coupled, respectively. An end effector 9 (e.g., pipette or the like) for use in production of the medicinal products, is detachably mounted to the attachment 7.

Figure 2:
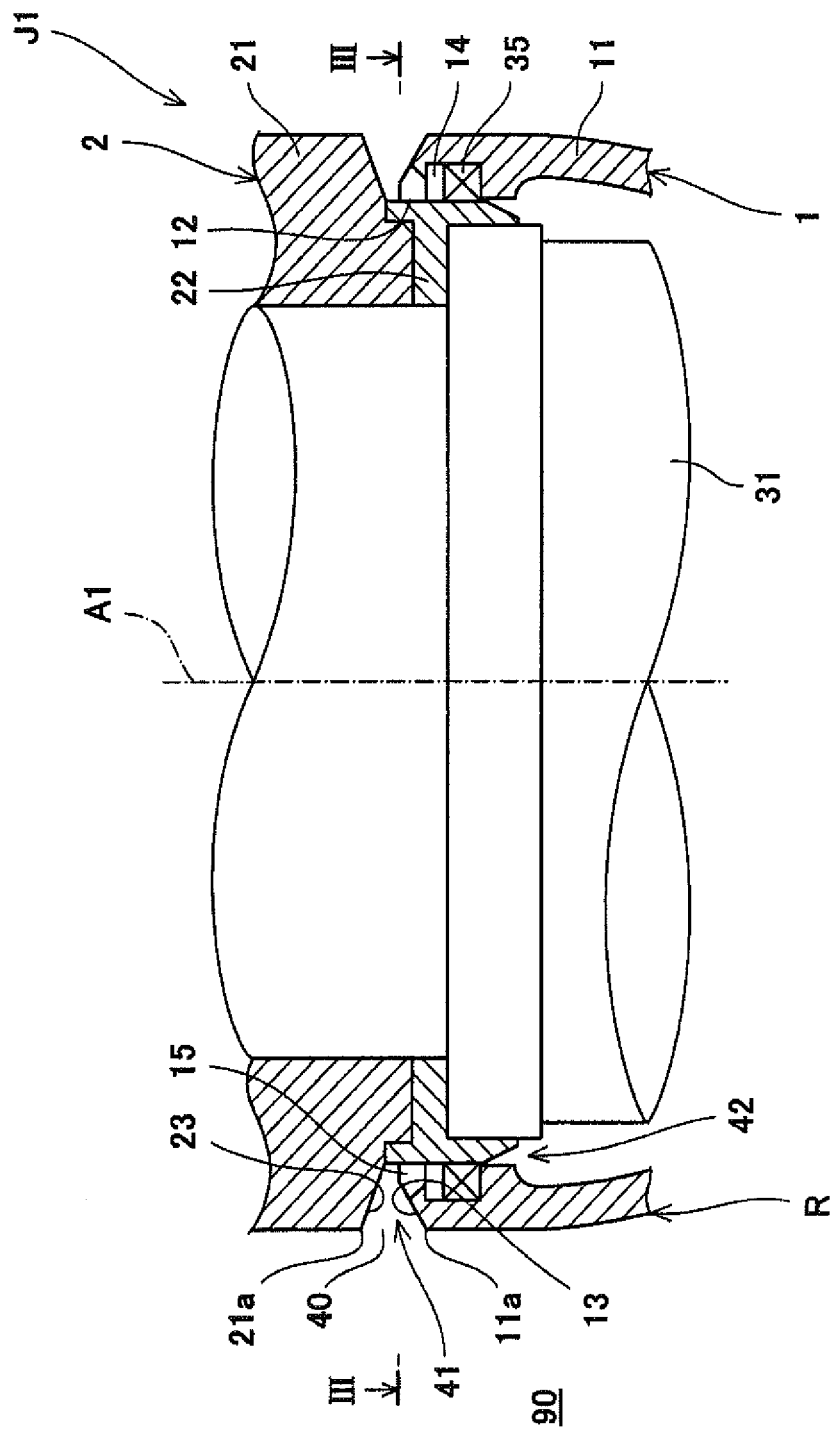
FIG. 2 is a cross-sectional view of a joint seal structure taken along line II-II of FIG. 1.
Figure 3:
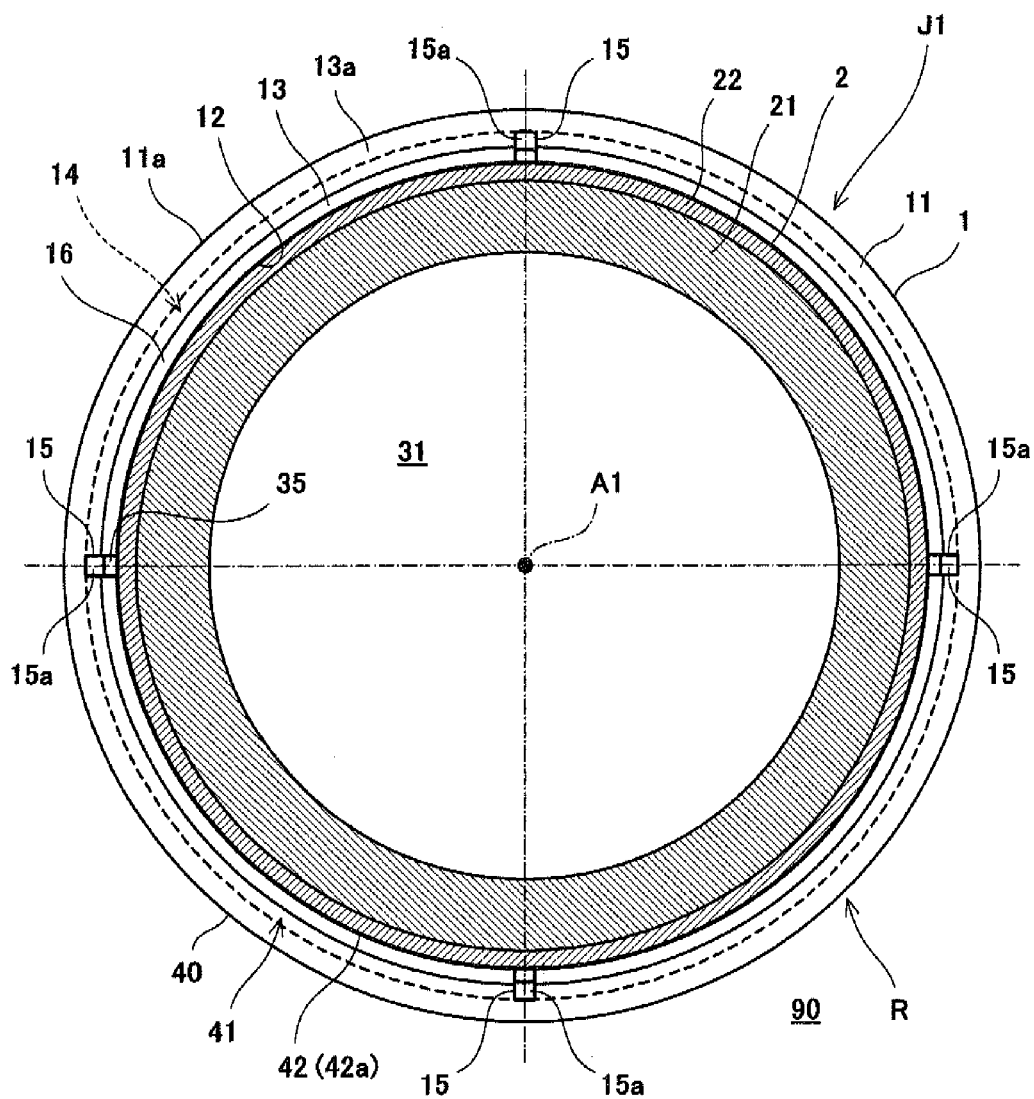
FIG. 3 is a cross-sectional view of the joint seal structure taken along line of FIG. 2.

FIG. 2 is a cross-sectional view of a joint seal structure taken along line II-II of FIG. 1. FIG. 3 is a cross-sectional view of the joint seal structure taken along line of FIG. 3. FIGS. 2 and 3 exemplarily show the first joint J1, of the six joints J1 to J6 of FIG. 1. Hereinafter, the first joint J1 will be described with reference to FIG. 2, and others. The other joints have substantially the same structure, and will not be described in detail repeatedly.

As shown in FIG. 2, the base member 1 (first member) includes a tubular end portion 11. The first joint J1 is configured such that the rotary member 2 (second member) is fittingly inserted into the tubular end portion 11 of the base member 1. Although in the present embodiment, the member (second member) to be fittingly inserted is rotatable with respect to the member (first member) having the tubular end portion, the member (first member) having the tubular end portion may be rotatable with respect to the member (second member) to be fittingly inserted.

The tubular end portion 11 has a cylindrical shape, and is formed with a circular insertion opening 12 at a distal (tip) end thereof. The rotary member 2 includes a body 21 and a fitting end portion 22 provided integrally with the end portion of the body 21. Each of the body 21 and the fitting end portion 22 has a cylindrical shape. The fitting end portion 22 is fittingly inserted inward relative to the inner periphery of the tubular end portion 11 through the insertion opening 12 such that the fitting end portion 22 is rotatable and slidable.

The first joint J1 contains a drive mechanism for rotating the rotary member 2 with respect to the base member 1. In FIG. 2, as an exemplary component of the drive mechanism, a rotary shaft 31 is shown. The rotary shaft 31 extends through the interior of of the tubular end portion 11, penetrates the fitting end portion 22, extends to the interior of the body 21 and is fastened to the rotary member 2. The rotary shaft 31 may be fastened to the rotary member 2 by any means. For example, a bolt (not shown) inserted into the rotary shaft 31 may penetrate the fitting end portion 22 and may be threadingly engaged with the body 21. The rotary shaft 31 is driven by an actuator (not shown) attached to the base member 1 and is rotatable around its center axis. When the rotary shaft 31 rotates, the base member 1 does not move, but the rotary member 2 rotates around the center axis of the rotary shaft 31. The center axis of the rotary shaft 31 constitutes a first rotational axis A of the first joint J1, and is placed coaxially with the center axis of the tubular end portion 11, the center axis of the fitting end portion 22, and the center axis of the body 21. The first joint J1 further contains components of the drive mechanism, such as a bearing supporting the rotary shaft 31 such that the rotary shaft 31 is rotatable, although not shown.

The fitting end portion 22 has a smaller diameter than the body 21. The rotary member 2 includes a stepped surface 23 connecting the outer peripheral surface of the fitting end portion 22 to the outer peripheral surface of the body 21. The stepped surface 23 extends radially outward from the fitting end portion 22 toward the outer peripheral surface of the body 21, and has a ring shape when viewed from the direction perpendicular to the axis. The tubular end portion 11 has a ring-shaped end surface 13 defining the insertion opening 12. The stepped surface 23 faces the end surface 13 and is located close to (at a little distance from) the end surface 13 in an axial direction.

The body 21 is exposed from the tubular end portion 11. The outer peripheral surface of the body 21 is located at a distance from the outer peripheral surface of the tubular end portion 11 in the axial direction. The axial end edge 21a of the outer peripheral surface of the body 21 and the axial end edge 11a of the outer peripheral surface of the tubular end portion 11 define an opening 40 via which the operation space 90 is in communication with the interior of the first joint J1. In the inside region (closer to the center in a radial direction) of the opening 40, a gap 41 is formed between the end surface 13 and the stepped surface 23. The gap 41 is in communication with a clearance 42 formed between the inner peripheral surface of the tubular end portion 11 and the outer peripheral surface of the fitting end portion 22.

As in the end edge 11a, and the end edge 21a, the opening 40 extends over the entire periphery of the tubular end portion 11 in the circumferential direction, or over the entire periphery of the body 21 in the circumferential direction, and has a circular shape when viewed from the direction perpendicular to the axis (see FIG. 3). As in the end surface 13 and the stepped surface 23, the gap 41 extends over the entire periphery of the tubular end portion 11 in the circumferential direction, or over the entire periphery of the fitting end portion 22 in the circumferential direction, and has a ring-shaped cross section (see FIG. 3), when viewed from the direction perpendicular to the axis. The radially outer peripheral edge portion of the gap 41 is opened to the operation space 90 which is outside of the base member 1 and the rotary member 2, through the opening 40 with the circular shape when viewed from the direction perpendicular to the axis. The clearance 42 is defined by the inner peripheral surface of the tubular end portion and the outer peripheral surface of the fitting end portion. Therefore, the clearance 42 extends over the entire periphery of the tubular end portion 11 in the circumferential direction, or over the entire periphery of the fitting end portion 22 in the circumferential direction, and has a ring-shaped cross section when viewed from the direction perpendicular to the axis, although not shown in detail.

The tubular end portion 11 includes on its inner peripheral surface a peripheral groove 14 extending over the entire periphery. The first joint J1 is provided with an annular seal member 35 accommodated into the peripheral groove 14. The seal member 35 is adhesively attached at its outer peripheral portion to the tubular end portion 11 and at its inner peripheral portion to the outer peripheral surface of the fitting end portion 22. This allows the seal member 35 to seal the clearance 42. Hereinafter, a portion of the clearance 42, which is closer to the axial distal end from the perspective of the peripheral groove 14 (i.e., spatially closer to the gap 41 and the opening 40) will be referred to as a distal end clearance 42a, while a portion of the clearance 42, which is closer to the axial base end from the perspective of the peripheral groove 14 (i.e., spatially more distant from the gap 41 and the opening 40) will be referred to as an inward clearance 42b.

The seal member 35 spatially isolates the interior of the first joint J1 including the inward clearance 42b, from the distal end clearance 42a, the gap 41, the opening 40, and the operation space 90. The first joint J1 does not include another seal member on a spatial path extending toward the operation space 90, from the perspective of the seal member 35. However, the first joint J1 may include another seal member on a spatial path extending away from the operation space 90, from the perspective of the seal member 35, although this is not shown.

Figure 4:
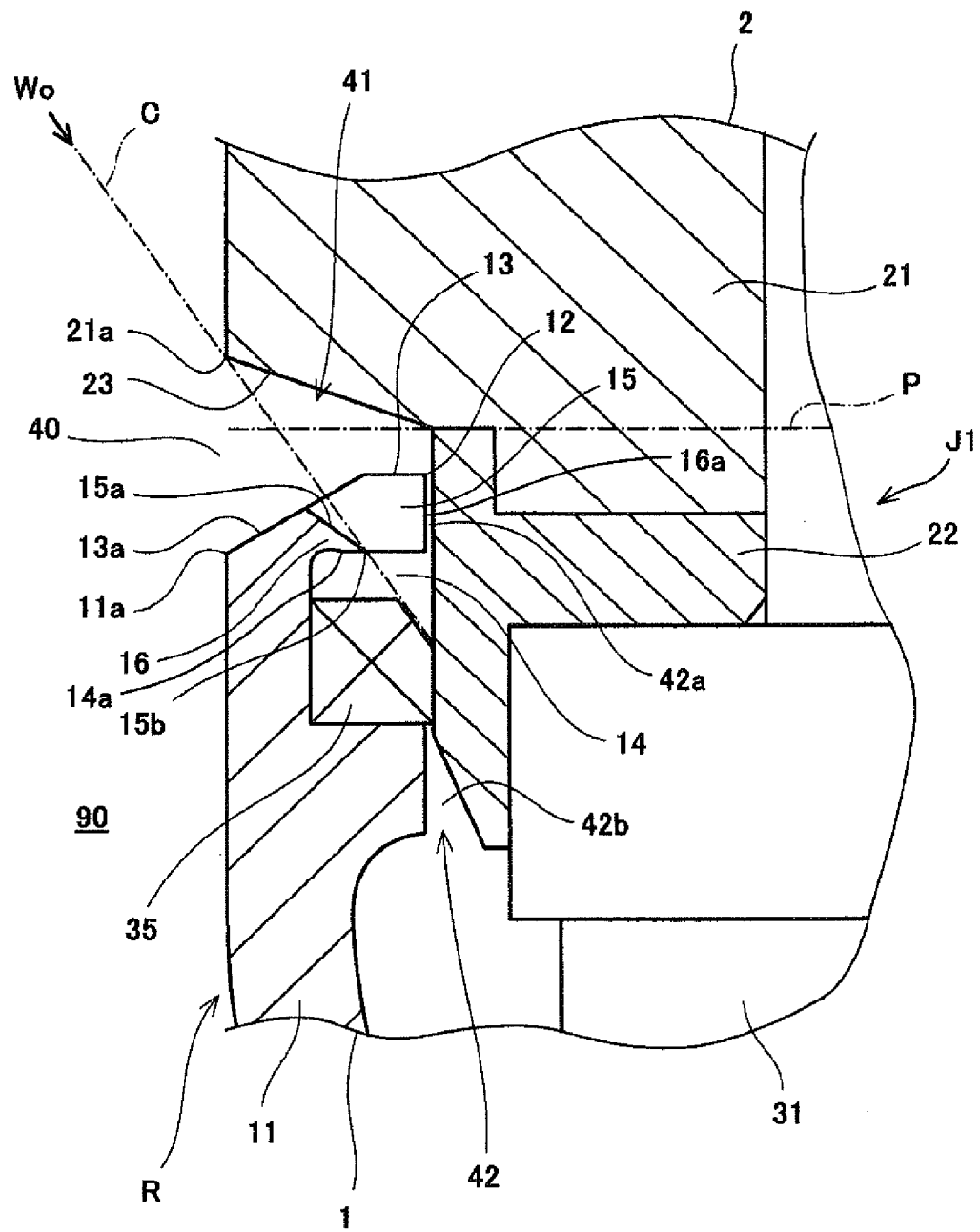
FIG. 4 is a cross-sectional view showing a region in the vicinity of a seal member of FIG. 2.
Figure 5:
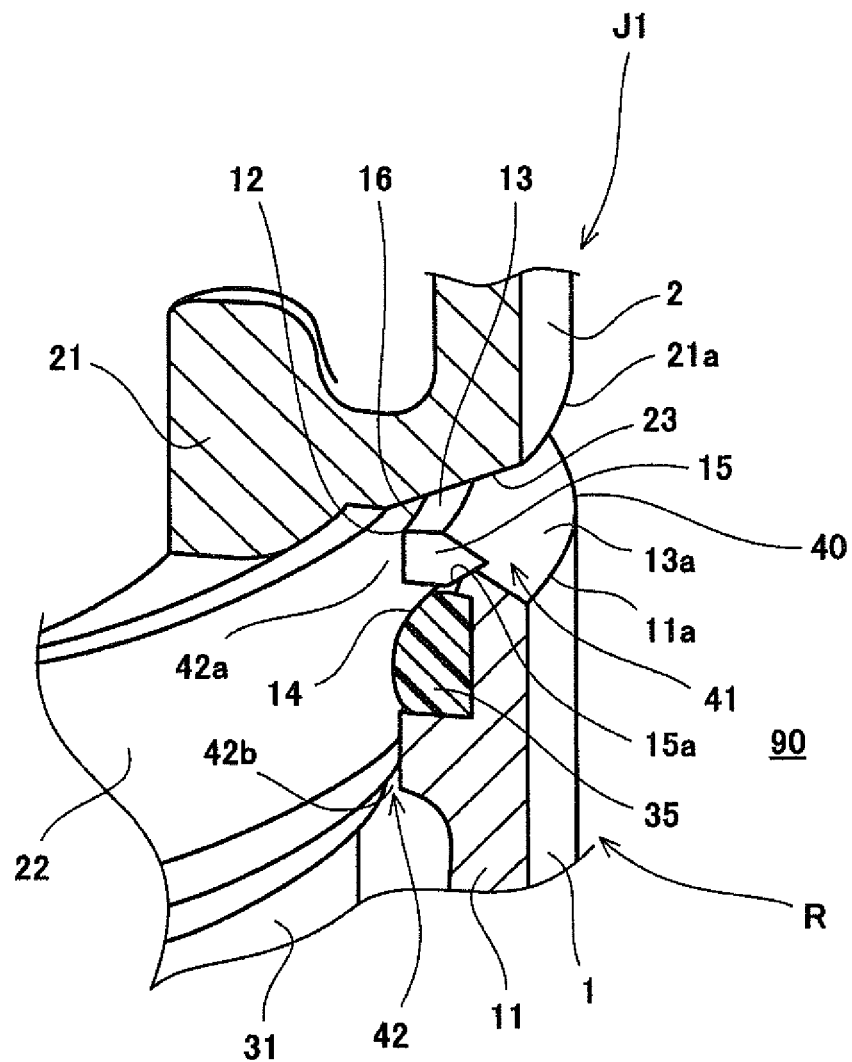
FIG. 5 is a perspective cross-sectional view showing a region in the vicinity of the seal member of FIG. 2.

FIG. 4 is an enlarged view of FIG. 2 and a cross-sectional view showing a region in the vicinity of the seal member 35 of FIG. 2. FIG. 5 is a perspective cross-sectional view showing a region in the vicinity of the seal member 35 of FIG. 2. As described above, the gap 41 is formed between the stepped surface 23 and the end surface 13, extends over the entire periphery of the stepped surface 23 in the circumferential direction and the end surface 13 over the entire periphery in the circumferential direction, and is opened at its outer peripheral edge portion to outside of the base member 1 and the rotary member 2, through the opening 40. The gap 41 has a ring-shaped cross-section when viewed from the direction perpendicular to the axis, the cross section expanded in the axial direction as it extends radially outward.

As shown in FIGS. 4 and 5, to allow the gap 41 to have the cross-section expanded in the axial direction as described above, the stepped surface 23 is partially or entirely inclined or curved to be away from the end surface 13 as it extends radially outward. In the present embodiment, the stepped surface 23 is inclined with respect to the plane P in such a way that the stepped surface 23 is away from the tubular end portion 11 as it extends radially outward, over the entire region from the inner peripheral edge connected to the outer peripheral surface of the fitting end portion 22 to the outer peripheral edge (i.e., end edge 21a) connected to the outer peripheral surface of the body 21.

To allow the gap 41 to have the cross-section expanded in the axial direction, the end surface 13 of the tubular end portion 11 is also partially or entirely inclined or curved to be away from the stepped surface 23 as it extends radially outward. In the present embodiment, the inner peripheral edge portion of the end surface 13, which defines the opening 12, is parallel to plane P, and the end surface 13 has an inclined surface 13a connected to this parallel portion. The inclined surface 13a is inclined with respect to the plane P in such a way that the inclined surface 13a is away from the body 21 as its extends radially outward. The outer peripheral edge of the inclined surface 13a is connected to the outer peripheral surface of the tubular end portion 11.

As described above, in the present embodiment, in the inner peripheral edge portion, the end surface 13 is parallel to the plane P, while the inclined the stepped surface 23 is inclined with respect to the plane P in such a way that the stepped surface 23 is away from the tubular end portion 21 as it extends radially outward. As a result, the end surface 13 and the stepped surface 23 are away from each other as they extend radially outward, and therefore the gap 41 is expanded in the axial direction as it extends radially outward. In the outer peripheral edge portion, the end surface 13 (inclined surface 13a) and the stepped surface 23 are inclined to be away from each other, and therefore the gap 41 is expanded in the axial direction as it extends radially outward. As a result, in the present embodiment, the gap 41 has a V-shape in cross-section taken along the axial direction.

The shape of the stepped surface 23 and the shape of the end surface 13 are merely exemplary. The stepped surface 23 and the end surface 13 may have another shapes so long as the stepped surface 23 and the end surface 13 can realize the gap expanded in the axial direction, (i.e., the stepped surface 23 and the end surface 13 are away from each other in the axial direction as they extend radially outward). The stepped surface 23 may be partially or entirely curved, while the end surface 14 may be entirely curved or inclined. The stepped surface 23 may have a curved portion and a flat portion. Or, the stepped surface 23 may have a portion parallel to the plane P, or a portion which is inclined or curved in a direction that is opposite to the above described direction, with respect to the plane P. The same applies to the end surface 13. The stepped surface 23 may be connected to the outer peripheral surface of the body 21 and/or the outer peripheral surface of the fitting end portion 22, via round corner(s). The same applies to the end surface 13.

The end surface 13 has an opening 15 via which the peripheral groove 14 is in communication with the gap 41. The tubular end portion 11 has an end wall portion 16 which is closer to the axial distal end than the peripheral groove 14 is. The end wall portion 16 includes the end surface 13 and a side surface 14a which is on the opposite side of the end surface 13 and surrounds the peripheral groove 14. An inner peripheral surface 16a of the end wall portion 16 defines the insertion opening 12 and constitutes the distal end clearance 42a along with the outer peripheral surface of the fitting end portion 22. The opening 15 is provided in the end wall portion 16. Through the opening 15, the peripheral groove 14 defined by the side surface 14a is in communication with the gap 41 defined by the end surface 13.

With reference to FIG. 3, the opening 15 is formed by cutting out a portion of the end wall portion 16 from its inner peripheral surface 16a, in the radially outward direction. The tubular end portion 11 has a plurality of openings 15 which are arranged to be spaced apart from each other in the circumferential direction. In the present embodiment, four openings 15 are arranged at equal intervals (i.e., at intervals of 90 degrees) in the circumferential direction. Although in the example of FIG. 3, each of the openings 15 has a rectangular shape when viewed from the direction perpendicular to the axis, it may have a circular shape or a non-circular shape. The number of the openings 15 is not limited to four and may be suitably changed.

Since the opening 15 is formed by cutting out a portion of the end wall portion 16 from its inner peripheral surface 16a, the distal end clearance 42a is expanded radially in the location where the end wall portion 16 is cut out. In the present embodiment, the opening 15 serves to radially expand a portion of the distal end clearance 42a extending over the entire periphery in the circumferential direction. This allows a portion of the peripheral groove 14 to be easily in communication with the gap 41. Alternatively, the opening 15 may be formed in such a manner that it axially penetrates the end wall portion 16 in a portion which is radially outward relative to the inner peripheral surface 16a of the end wall portion 16. In this case, the distal end clearance 42a is not expanded. However, a portion of the peripheral groove 14 is allowed to be easily in communication with the gap 41.

Turning back to FIG. 4, with reference to the cross-section of the opening 15 which is taken along the axial direction, the opening 15 has a side surface 15a at its radially outward side. The side surface 15a does not extend straightly in the axial direction and is inclined in the radially outward direction as it extends toward the axial distal (tip) end (i.e., it is closer to the end surface 13). In other words, the side surface (also will be referred to as "inclined surface") 15a is inclined with respect to the plane P in such a way that the surface 15a is closer to the body 21 as it extends radially outward.

An axial end edge 15b of the inclined surface 15a of the opening 15 is the inner peripheral edge of the inclined surface 15a, and is also the inner peripheral edge of the side surface 14a of the peripheral groove 14. The seal member 35 is placed radially outward relative to a conical surface C which is in contact with the end edge 15b and the end edge 21a of the body 21. As shown in FIG. 4, the conical surface C is indicated by a straight line in the cross-section taken along the axial direction.

In accordance with the joint seal structure configured as described above, the seal member 35 is accommodated in the peripheral groove 14 formed in the inner peripheral surface of the tubular end portion 11. This allows the seal member 35 to be located in the inside region in the first joint J1, as compared to a case where the seal member 35 is provided in the opening 40. The seal member 35 is covered by the end wall portion 16. In this configuration, even if abrasion power is generated in the seal member 35 during the operation of the robot R, it becomes possible to suppress the abrasion power from being scattered to the operation space 90. Because of this, the robot R can be suitably employed in the use which requires a high clean level.

In the use which requires a high clean level, the high-pressure washing water is injected from the operation space 90 to the robot R, during the washing of the robot R on a regular basis. The high-pressure washing water from the operation space 90 flows into the gap 41 through the opening 40. In the gap 41, the washing water is injected to the stepped surface 23 or the end surface 13, and travels linearly through the gap 41. The washing water flows into the distal end clearance 42a through the insertion opening 12. The washing water which has flowed into the gap 41 also flows into the opening 15. Then, the washing water flows into the peripheral groove 14 through the opening 15 or the distal end clearance 42a.

In the present embodiment, the gap 41 is expanded axially as it extends radially outward. For this reason, the opening 40 is opened widely in the axial direction. In this structure, the high-pressure washing water from the operation space 90 can be introduced into the gap 41 with a large amount and flows smoothly into the gap 41. Therefore, the stepped surface 23 and the end surface 13 defining the gap 41 can be washed with higher efficiency.

In the present embodiment, since the opening 15 via which the peripheral groove 14 is in communication with the gap 41 is provided, the water can be guided smoothly from the gap 41 into the peripheral groove 14. Therefore, even when the peripheral groove 14 is placed in the inside region to protect the seal member 35, the inner region of the peripheral groove 14 can be washed with higher efficiency. Since the opening 15 is provided in this way, the seal member 35 can be protected and the region in the vicinity of the seal member 35 can be washed with higher efficiency. In particular, in the present embodiment, the openings 15 are arranged to be spaced apart in the circumferential direction so that the peripheral groove 14 is in communication with the gap 41 through the openings 15 in limited local regions and with limited degrees. As a result, the seal member 35 can be protected more effectively.

As described above, the washing water which has flowed into the gap 41 may flow into the distal end clearance 42a through the insertion opening 12. It cannot be expected that the water flows into the distal end clearance 42a with a large amount. Once the water flows into the distal end clearance 42a, it is difficult to discharge the water therefrom. In the present embodiment, the opening 15 is formed by cutting out a portion of the end wall portion 16 from its inner peripheral surface 16a, and serves to radially expand a portion of the distal end clearance 42a. Therefore, the washing water which has flowed from the gap 41 into the opening 15 rather than the insertion opening 12, is allowed to flow in the circumferential direction and into the distal end clearance 42a. Thus, the distal end clearance 42a can be washed with higher efficiency. In addition, the washing water which has flowed into the distal end clearance 42a is easily discharged through the opening 15. Thus, the water can be discharged from the distal end clearance 42a with higher efficiency.

During the water discharge, the rotary shaft 31 may be rotated to rotate the rotary member 2 with respect to the base member 1. This causes the fitting end portion 22 to rotate and slide with respect to the seal member 35 and the tubular end portion 11. Thereby, the washing water staying in the distal end clearance 42a can be easily guided to the openings 15, and can be discharged with higher efficiency. In addition, the washing water staying in the peripheral groove 14 is easily guided to the gap 41 through the opening 15, and can be discharged with higher efficiency. Furthermore, the droplets of the washing water adhering to the stepped surface 23 can be splashed in the radially outward direction, with a centrifugal force, and the washing water can be discharged from the gap 41 with higher efficiency. In the present embodiment, the stepped surface 23 defining the gap 41 and the inclined surface 15a are inclined to be away from each other. In this structure, the washing water staying in the gap 41 can be guided to the opening 40 along the stepped surface 23 and the inclined surface 15a. As a result, the water discharge efficiency can be increased.

The seal member 35 is accommodated in the peripheral groove 14 placed in the inside region relative to the distal end clearance 42a, from the perspective of the opening 40. The high-pressure washing water is less likely to directly contact the seal member 35, even though the opening 15 is provided. Therefore, the seal function for the clearance 42 performed by the seal member 35 is less likely to be lost due to the high-pressure washing water, which can prevent a situation in which the high-pressure washing water flows into the inward clearance 42a and the inner region of the first joint J1 which is in communication with the inward clearance 42a, through the peripheral groove 14. As a result, the washing water does not undesirably remain in the first joint J1, and the components of the drive mechanism, including the rotary shaft 31, can be protected.

Especially, in the present embodiment, as described above, the seal member 35 is accommodated in the peripheral groove 14, and placed radially outward relative to the conical surface C which is in contact with the end edge 15b of the opening 15 and the end edge 21a of the body 21. When the high-pressure washing water from the operation space 90 travels toward the first joint J1 along the conical surface C, it can flow to the most inside region of the first joint J1 through the opening 40. Since the seal member 35 is placed radially outward relative to the conical surface C, even the high-pressure washing water WO travelling along the conical surface C does not directly contact the seal member 35. Therefore, the seal function for the clearance 42 is less likely to be lost due to the high-pressure washing water.

If the inclination of the stepped surface 23 is increased or the opening 15 is expanded radially, the opening 40, the gap 41 and the opening 15 are increased in size, and the gap 41, the distal end clearance 42a, and the peripheral groove 14 can be washed with higher efficiency, and the water can be discharged from these spaces with higher efficiency. In contrast, since the conical surface C reaches the inside region of the peripheral groove 14, the high-pressure washing water is more likely to contact the seal member 35.

In light of the above, the seal member 35 is preferably configured such that the axial distal end portion of the radially inner edge portion is away radially from the outer peripheral surface of the fitting end portion 22 as it is closer to the body 21. With this shape, the seal member 35 can be made away from the conical surface C. Therefore, the washing efficiency and the water discharge efficiency can be increased, for example, by increasing the inclination of the stepped surface 23, and it becomes possible to prevent the seal function for the clearance 42 from being lost due to the high-pressure washing water.

Further, in the present embodiment, as described above, the opening 15 has the inclined surface 15a. Because of this inclination, in the inside portion (radially outer peripheral portion) of the opening 15, the opening 15 can be expanded as much as possible in the radially outward direction, in the vicinity of the gap 41. In this structure, the washing water flowing into the gap 41 through the opening 40 is easily guided to the distal end clearance 42a and the peripheral groove 14 through the opening 15. Therefore, the distal end clearance 42a and the peripheral groove 14 can be washed with higher efficiency. Also, the washing water staying in the distal end clearance 42a and the peripheral groove 14 can be easily discharged. Furthermore, because of this inclination, in the inside portion (radially outer peripheral portion) of the opening 15, the end wall portion 16 can be left to a largest possible extent, in the vicinity of the peripheral groove 14. This makes it possible to prevent the seal member 35 from being exposed significantly to the gap 41 through the opening 15, and therefore suitably protect the seal member 35 accommodated in the peripheral groove 14 with the end wall portion 16. In this way, the washing efficiency and the water discharge efficiency can be increased, and the seal member 35 can be protected.

Figure 6:
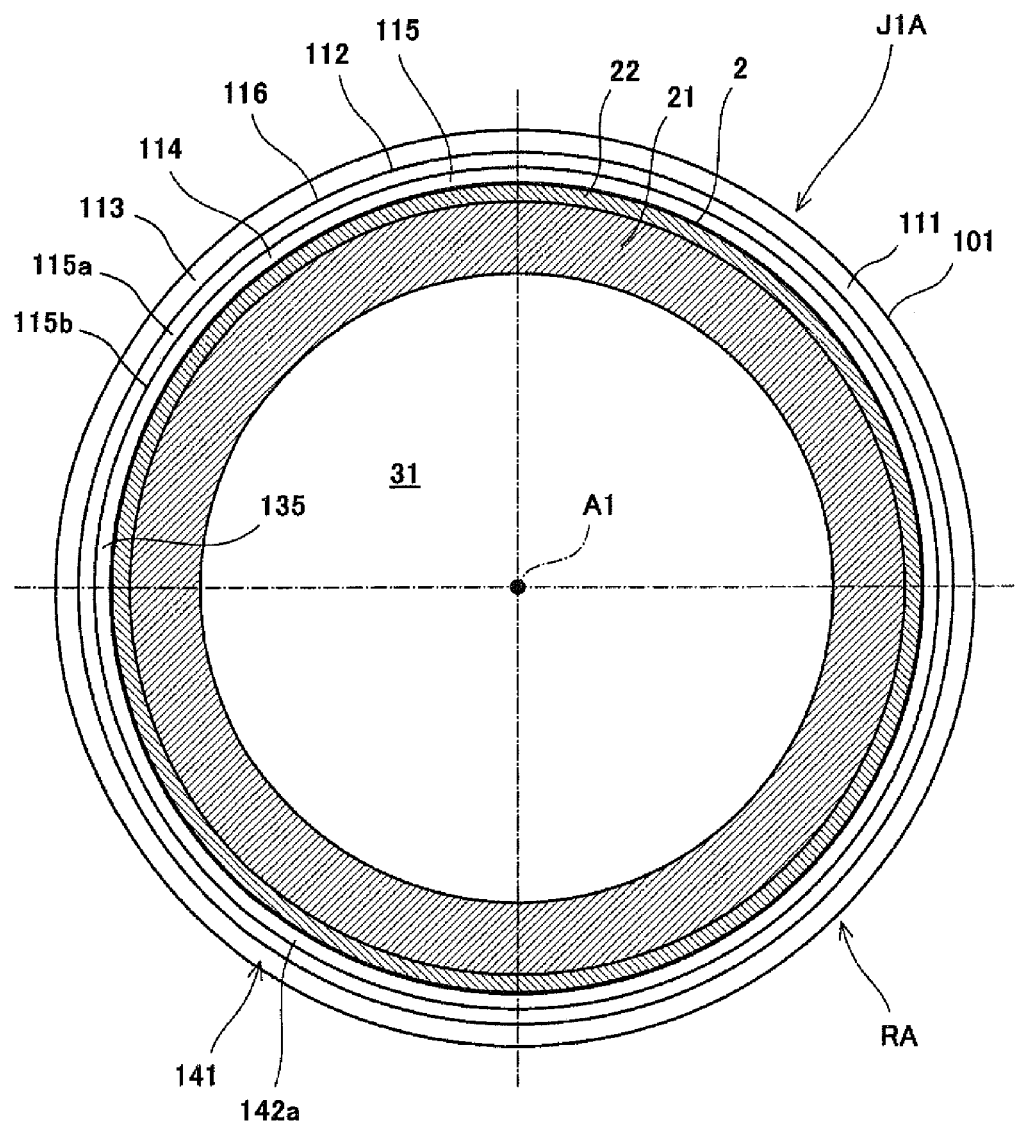
FIG. 6 is a cross-sectional view of a joint seal structure of a robot according to Embodiment 2.
Figure 7:
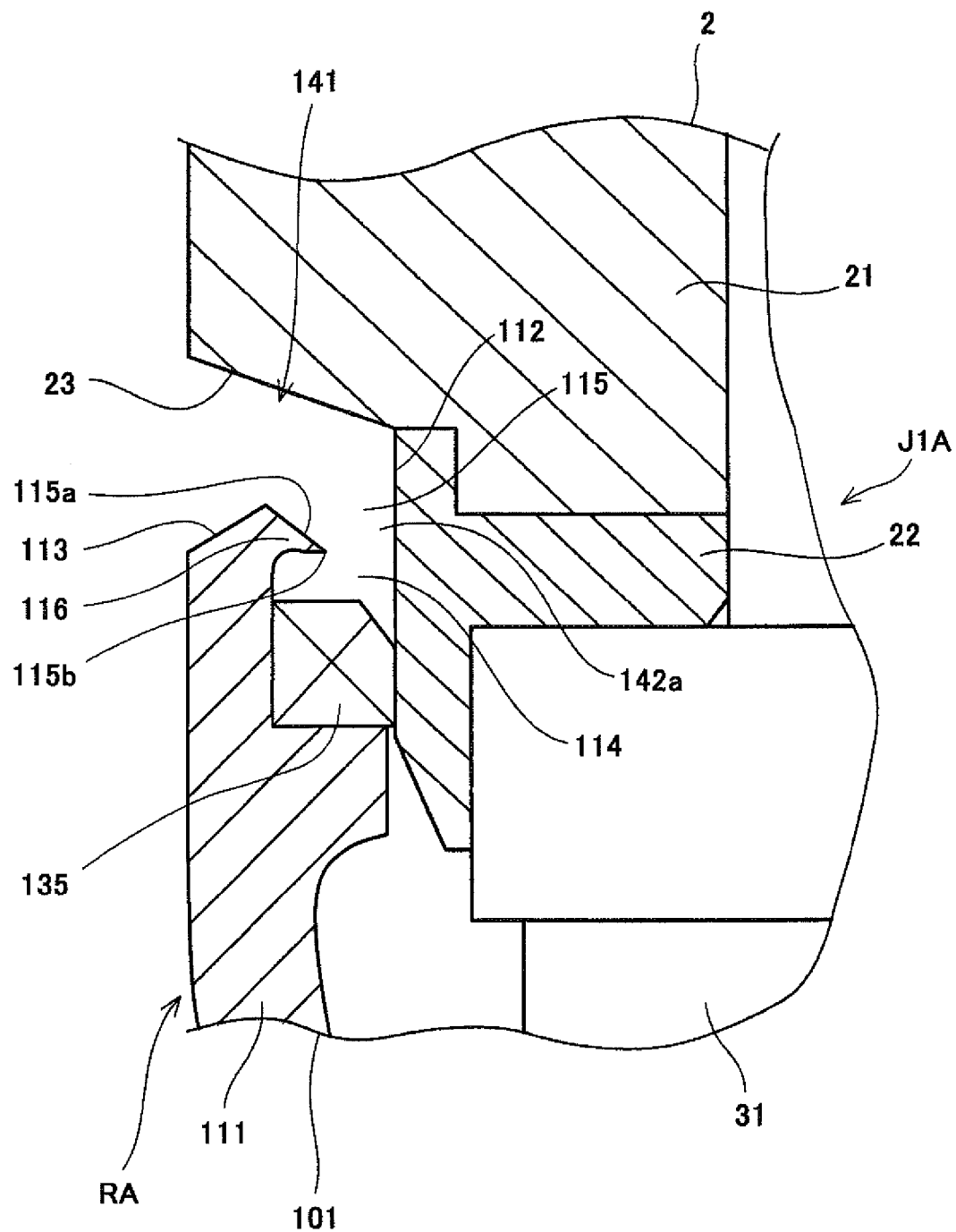
FIG. 7 is a cross-sectional view of the joint seal structure of the robot of FIG. 6.

FIGS. 6 and 7 are cross-sectional views of the joint seal structure of a robot RA according to Embodiment 2. The joint seal structure according to Embodiment 2 is the same as that according to Embodiment 1 except for the structure of an opening 115 and a region in the vicinity of the opening 115. As shown in FIG. 6, in a joint J1A according to the present embodiment, the opening 115 extends in the circumferential direction over the entire periphery of an end wall portion 116 of a tubular end portion 111 of a base member 101. In the present embodiment, the opening 115 is formed in such a manner that the inner peripheral surface of the end wall portion 116 is set back in the radially outward direction. As a result, the opening 115 allows an insertion opening 112 and a distal end clearance 142a to be expanded in the radially outward direction over the entire peripheries in the circumferential direction. A peripheral groove 114 is in communication with a gap 141 in the axial direction through the opening 115, in any location in the circumferential direction. By using the opening 115 having such a structure, the peripheral groove 114 and the distal end clearance 142a can be washed with higher efficiency, and the washing water can be discharged from the peripheral groove 114 with higher efficiency. As in Embodiment 1, an axial end edge 115b of an inclined surface 115a of the opening 115 is located closer to the center in the radial direction than the outer peripheral surface of a seal member 135 is. Thereby, the seal member 135 can be protected by the end wall portion 116. An end surface 113 of the tubular end portion 111 extends radially outward from the axial distal end edge of the inclined surface 115a, and is inclined to be away from the stepped surface 23 as it extends radially outward.

Figure 8:
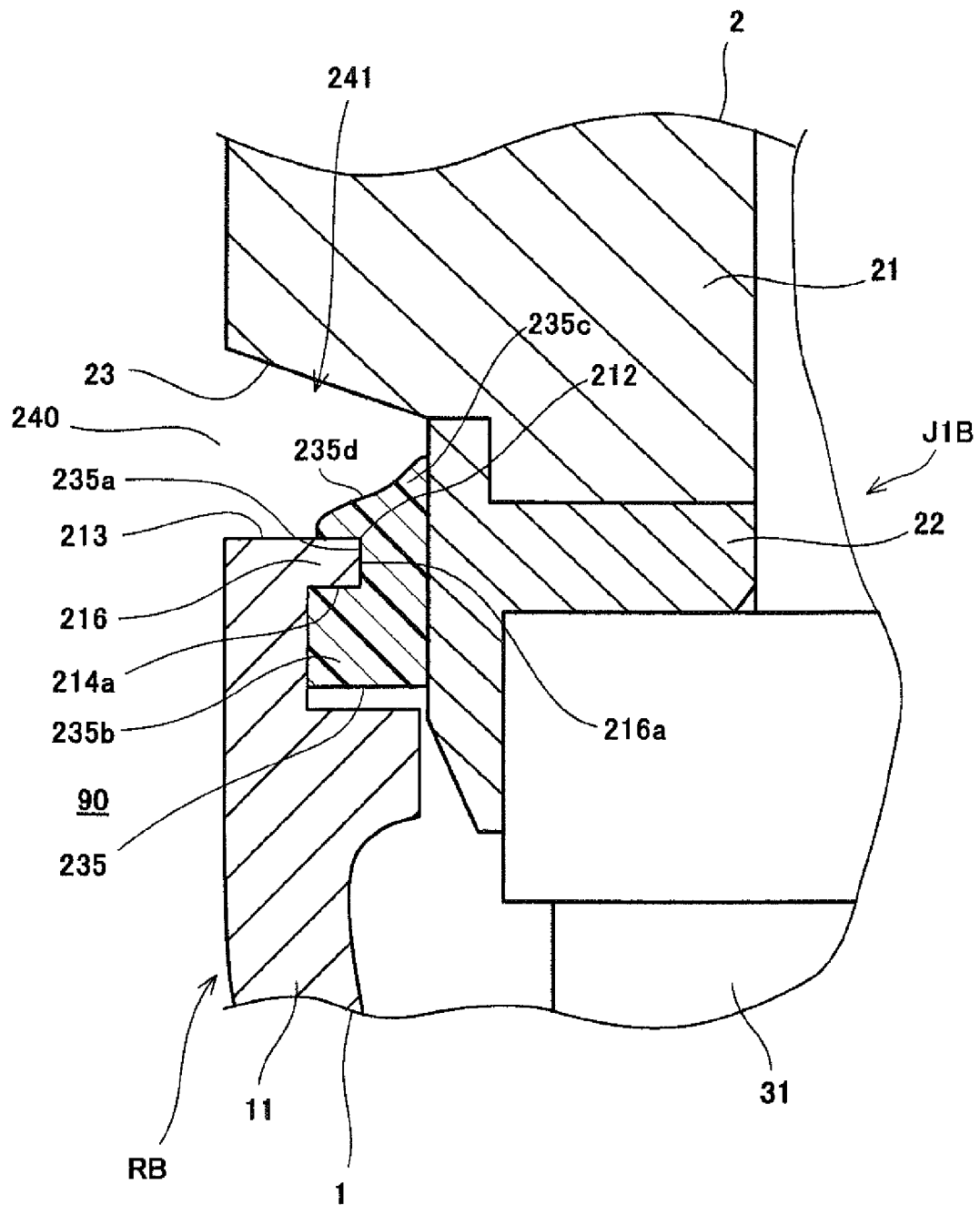
FIG. 8 is a cross-sectional view of a joint seal structure of a robot according to Embodiment 3.

FIG. 8 is a cross-sectional view of the joint seal structure of a robot RB according to Embodiment 3. As shown in FIG. 8, in a joint J1B according to the present embodiment, a tubular end portion 211 of a base member 201 includes a circular insertion opening 212 at its distal end, and a ring-shaped end surface 213 defining the insertion opening 212. The end surface 213 faces the stepped surface 23 of the rotary base 2 and is located close to the stepped surface 23 in the axial direction. An opening 240 is formed between the outer peripheral surface of the body 21 and the outer peripheral surface of the tubular end portion 211. In the inner side of opening 240, a gap 241 is formed between the end surface 213 and the stepped surface 23. The gap 241 is expanded as it extends radially outward. The tubular end portion 211 includes on its inner peripheral surface a peripheral groove 214 extending over the entire periphery, and an end wall portion 216 located closer to an axial distal end than the peripheral groove 214 is. The end wall portion 216 includes the end surface 213, a side surface 214a which is on the opposite side of the end surface 213 and surrounds the peripheral groove 214, and an inner peripheral surface 216a facing the outer peripheral surface of the fitting end portion 22.

An annual seal member 235 includes a groove 235a extending over the entire periphery, in its axial intermediate portion. The end surface 216 is fitted into the groove 235a in a state in which the radially inner edge portion of the end surface 213, the radially inner edge portion of the side surface 214a, and the inner peripheral surface 216a are in sealing contact with a surface defining the groove 235a. The seal member 235 includes an accommodating section 235b accommodated into the peripheral groove 214, in a location that is closer to the axial base end than the groove 235a is. The seal member 235 includes a distal end portion 235c which protrudes from the end surface 213 and is exposed into the gap 241, in a location that is closer to the axial base end than the groove 235a is. The seal member 235 is placed closer to the center in the radial direction than the outer peripheral surface of the tubular end portion 211 and the outer peripheral surface (i.e., opening 240) of the body 21. Thus, in the present embodiment, a portion of the seal member 235 is exposed into the gap 241 and placed closer to the center in the radial direction than the outer peripheral surface of the tubular end portion 211 and the outer peripheral surface of the body 21. The distal end portion 235c has an inclined surface 235d which is inclined toward the axial distal end, as it extends from the radially outer peripheral edge which is in contact with the end surface 213 toward the radially inner peripheral edge which is in contact with the outer peripheral surface of the fitting end portion 22.

In the present embodiment, the seal member 235 closes the distal end clearance 42a or 142a of the above embodiment, and inhibits the peripheral groove 214 from being in communication with the gap 241. Because of this, only the gap 241 defined by the radially outer edge of the end surface 213, the stepped surface 23 and the inclined surface 235d is opened to the operation space 90 through the opening 240. In this structure, there is no narrow space into which the washing water and the sterilization gas flow, and the surface of the robot R can be easily sterilized. Since the gap 241 is expanded as it extends radially outward, the washing water and the sterilization gas easily flow into the gap 241, and are easily discharged from the gap 241. In addition, the washing water adhering onto the surface of the gap 241 can be easily wiped out (removed). Since the portion of the seal member 235, which defines a portion of the surface of the gap 241, is the inclined surface 235d, the washing water staying in the inside region of the gap 241 can be easily discharged. Since the seal member 235 is placed in the inside region of the gap 241, the seal member 235 can be protected.

Thus far, the embodiments have been described. The above described configuration can be suitably changed, added or deleted within the scope of the invention without departing from the spirit of the invention.

INDUSTRIAL APPLICABILITY

The present invention can achieve an advantage that seal can be protected even when a robot is washed with high-pressure washing water, and is widely applicable to robots including joints. In particular, the present invention is effectively applicable to a robot which requires a high clean level, for example, a robot used to produce medicinal products.

REFERENCE SIGNS LIST

R, RA, RB robot
J1 to J6, J1A, J1B joint
1 base member
2 rotary member
3 base end arm
4 distal end arm
5 base end wrist
6 distal end wrist
7 attachment
8 tubular end portion
12, 112, 212 insertion opening
13, 113, 213 end surface
14, 114, 214 peripheral groove
15, 115 opening
21 body
22 fitting end portion
23 stepped surface
35, 135, 235 seal member
40, 240 opening
41, 141, 241 gap

The invention claimed is:

1. A joint seal structure of a robot, including a first member and a second member fittingly inserted into a tubular end portion of the first member, the joint seal structure comprising:
   a fitting end portion which is provided on an end portion of the second member and fittingly inserted into the tubular end portion;
   a peripheral groove provided on an inner circumferential surface of the tubular end portion to extend over an entire periphery; and
   an annular seal member which is accommodated into the peripheral groove and is in sealing contact with an outer circumferential surface of the fitting end portion,
   wherein the fitting end portion has a smaller diameter than a body of the second member,
   wherein a stepped surface formed between the body and the fitting end portion faces an end surface of the tubular end portion and is located close to the end surface of the tubular end portion in an axial direction, and
   wherein a gap is provided between the stepped surface and the end surface of the tubular end portion such that the gap extends over the entire periphery, is opened to outside of the first member and the second member, and is expanded as the gap extends radially outward.

2. The joint seal structure of the robot according to claim 1, wherein the end surface of the tubular end portion has an opening via which the peripheral groove is in communication with the gap.

3. The joint seal structure of the robot according to claim 2, wherein the opening is one of openings arranged to be spaced apart from each other in a circumferential direction.

4. The joint seal structure of the robot according to claim 3, wherein the robot is a robot used to produce medicinal products.

5. The joint seal structure of the robot according to claim 2, wherein the opening extends over the entire periphery.

6. The joint seal structure of the robot according to claim 5, wherein the robot is a robot used to produce medicinal products.

7. The joint seal structure of the robot according to claim 2, wherein the robot is a robot used to produce medicinal products.

8. The joint seal structure of the robot according to claim 1, wherein a portion of the seal member is exposed from the end surface of the tubular end portion into the gap and located closer to a center in a radial direction than the outer circumferential surface of the tubular end portion and an outer circumferential surface of the body.

9. The joint seal structure of the robot according to claim 8, wherein the robot is a robot used to produce medicinal products.

10. The joint seal structure of the robot according to claim 1, wherein the robot is a robot used to produce medicinal products.

11. The joint seal structure of the robot according to claim 1,
   wherein the body of the second member is spaced apart in the axial direction from the tubular end portion of the first member, and is exposed in the tubular end portion.

12. The joint seal structure of the robot according to claim 1,
   wherein the stepped surface is located outward in the axial direction relative to the tubular end portion, and
   wherein the stepped surface faces the end surface of the tubular end portion and is located close to the end surface of the tubular end portion in the axial direction.

13. The joint seal structure of the robot according to claim 1,
   wherein the fitting end portion is fittingly inserted into the tubular end portion in such a manner that the fitting end portion is rotatable with respect to the tubular end portion.

* * * * *